Jan. 29, 1974  J. G. HUNT  3,788,820
FILLED EXTRUSION BILLETS AND METHODS OF FABRICATING
Filed Jan. 2, 1970
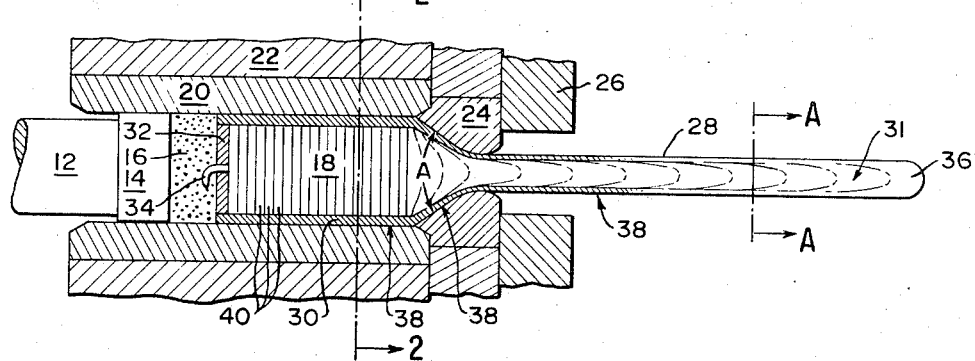
FIG. 1
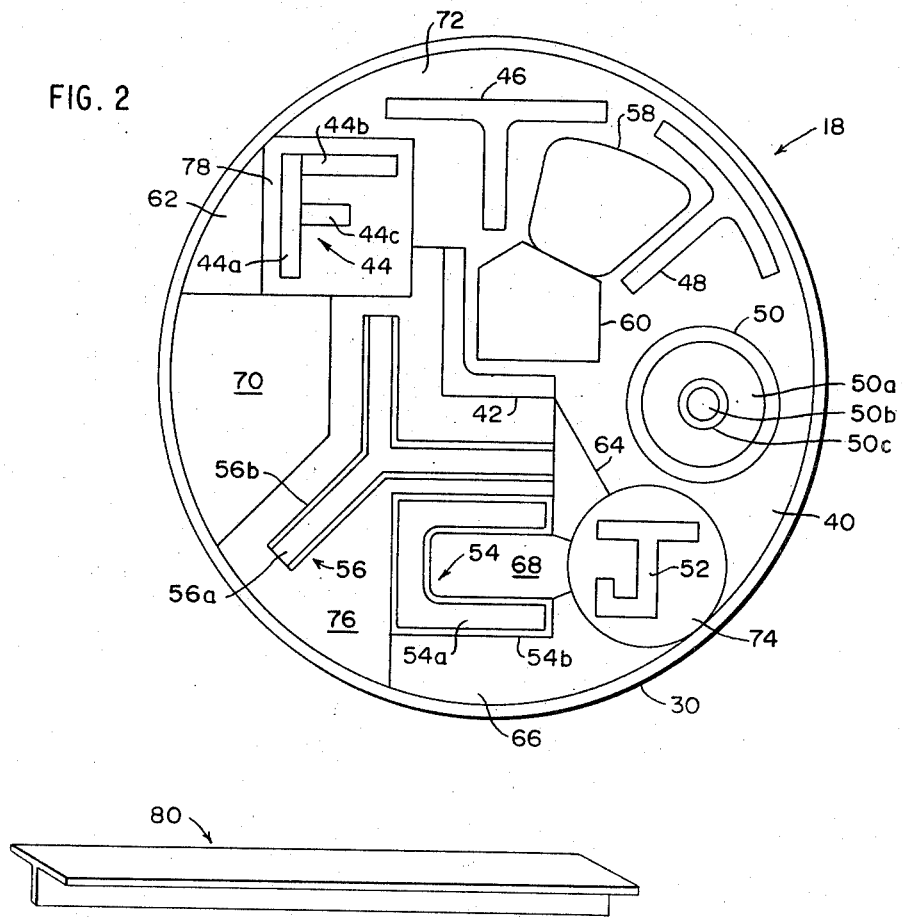
FIG. 2
FIG. 3
INVENTOR
JAMES G. HUNT
BY Kenway Jenney
+ Hildreth
ATTORNEYS United States Patent Office 3,788,820
Patented Jan. 29, 1974

3,788,820
FILLED EXTRUSION BILLETS AND METHODS
OF FABRICATING
James G. Hunt, Framingham, Mass., assignor to
Polymet Corporation, Cincinnati, Ohio
Filed Jan. 2, 1970, Ser. No. 231
Int. Cl. B32b 15/00
U.S. Cl. 29—187                                    36 Claims

ABSTRACT OF THE DISCLOSURE

A billet comprising preforms surrounded by filler material. The billet is fabricated with a laminated filler structure, each lamina having perforations to receive the preforms and being divided into segments by thin parting regions. The preforms are end loaded into the laminated structure.

BACKGROUND OF THE INVENTION

This invention relates generally to filled billet extrusion, and more particularly to improvements in billets and in the methods of fabricating the billets and of separating the forms therefrom after extrusion.

It has been recognized that certain metals, particularly stiff and reactive alloys, are difficult or impossible to fabricate by conventional methods of extrusion because of their properties, especially their high strength, that is, high resistance to deformation. Examples include the alloys of iron, nickel, cobalt, chromium, titanium and refractory alloys. The difficulties are particularly acute for cross sections of complex shape. The problems are further compounded by the imposition of close dimensional tolerances, surface finish specifications and other end product specifications, and also by limitations as to material availability and press capacity. Conventional and commercial methods almost invariably involve extrusion of round heated billets through shaped dies. The billets are heated prior to extrusion, and the combination of high billet temperatures and high extrusion pressures damages the tooling, particualrly the extrusion dies.

To minimize the foregoing difficulties it has been proposed to employ a filled billet method of extrusion, by which it is not necessary to use a die having the same shape as the desired extruded cross section. According to this method a preform is first prepared with a transverse cross section geometrically similar to but larger in area than the desired transverse cross section. This perform is placed centrally within a filler body with an inner space shaped to fit the preform and with a cylindrical outer configuration. This assembly or billet is then heated and extruded through a circular die, and the extruded rod so produced contains the extruded preform, hereinafter referred to simply as the "form," with approximately the desired cross section both as to shape and area. The coextruded filler body is then removed from the form, usually by chemical methods.

The filled billet method as hitherto practiced has not been used extensively because of the cost. Also, it has not been successfully employed in making forms of certain desired shapes, as well as of certain dimensional tolerances nad surface finishes. Each step in fabricting the billet and in removing the form from the coextruded filler body involves substantial cost. The filler body must be shaped to fit both the preform and the extrusion tooling. Since it must be made of a material having substantially the same stiffness or extrusion properties as the material of the preform, this ordinarily requires that the filler body be shaped by an expensive metal working operation such as machining, with all of the costs incident thereto including material loss, labor cost and machining time. Furthermore, the preform must also be shaped in a configuration that is an isometric enlargement of the desired form. The chemical removal of the filler body from the form is also costly and time consuming. Further, since billets used in the filled-billet method have larger cross sectional areas than conventional unfilled billets, larger and therefore costlier presses are required.

When a tapered form is desired, the conventional filled billet method is to machine a tapered preform and also an inversely-tapered, mating filler body. The necessity for machining tapered shapes adds substantially to the cost.

Forms of certain shapes produced by conventional filled billet methods cannot be readily curved into rings or arcs, particularly when they have straight, thin or complex portions or outlines in transverse cross section. When this is attempted, distortion and rippling results. Therefore, it has been necessary to employ other methods of fabrication, for example to machine round or rectangular bar stock that has been previously bent into a ring and the ends welded together.

When the filled billet method is practiced a preform never touches the die and is not ironed or smoothed out by it. Therefore the surface produced on the resulting form after extrusion is largely a function of the grain size of the preform prior to extrusion. This imposes a limitation on the grain size of the materials that can be chosen for use in the current filled billet method, particularly when a smooth surface is required, since coarse-grained materials produce rough surfaces by this method.

Many alloys desired in shaped sections or forms are so resistant to deformation that their uniform coextrusion by the usual filled billet method is not possible in a filler body made of low-cost common metal such as steel. The use of highly alloyed or refractory metal filler materials as strong as these preform alloys would insure uniform coextrusion, but the cost of these materials is great, and therefore the filled billet method has been economically limited to metals and alloys generally coextrudable in low-cost metals such as steel.

When the transverse cross sectional shape of a preform includes flat surfaces that are parallel or perpendicular to one another, as in T, H and L-sections, the extrusion of such shapes in cylindrical billets generally produces a shaped section which lacks parallelism and/or perpendicularity. This difficulty is attributed to small mismatches between filler and preform stiffness, compounded by the absence of parallelism between cylindrical billet tooling and longitudinal planes of the extruding preform.

A severe limitation on the filled billet method as hitherto practiced has been that only one perform has been extruded in each billet. This has been necessitated by the observation that non-uniform reduction of the cross section occurs away from the central portion of the cross-section of the billet, and this non-uniformity has been considered inherent in the method.

SUMMARY OF THE INVENTION

Novel methods are provided for economically fabricating billets and for their use in the filled billet method of extrusion. By properly controlling the extrusion conditions including extrusion tool design, extrusion practice and billet design, it is possible to achieve streamlined flow as evidenced by uniform reduction in the cross section of the billet extending from the center of the cross section substantially to its periphery. This permits the fitting of plural preforms in a single billet with a substantial saving in cost. The preforms may be of the same or different shapes and of the same or different alloys.

The billets are formed with a laminated structure of the filler material, each lamina or disk having perforations to receive the preforms and being divided, if desired, into segments by thin parting regions. The preforms are end loaded into the laminated structure. The preforms may have any of several structures and different preforms may have different structures in the same billet.

The billets and dies may be circular or of other shapes and these shapes may be so related to the preform shapes as to reduce the needed quantity of filler material and the extrusion forces required, and also so as to maintain more accurately the parallel and perpendicular relationships of the preform surfaces during extrusion.

The preforms may be distorted from the final cross sections desired to permit a larger number of preforms to be fitted in a single billet, and the resulting distorted, extruded forms may be worked or aligned into undistorted configuration in a subsequent forming operation.

The removal of the forms from the coextruded filler material may be facilitated by a number of techniques. These apply to both hollow and solid forms and include mechanical means wherein the extruded rod or body is drilled and/or parted along longitudinally extending surfaces, as well as chemical means.

The extruded rod or body may be subjected to further forming operations prior to separation of the forms from all or part of the filler material. Such operations may include tapering or producing rings or arc segments, for example.

The surface finish on the resulting forms may be controlled by providing preforms with surface layers of smaller grain size.

BRIEF DESCRIPTION OF THE DRAWING

FIG. 1 is a side elevation in section of an extrusion press loaded with a partially extruded billet made according to this invention.

FIG. 2 is a transverse elevation in section taken on line 2—2 of FIG. 1 showing the unextruded billet construction.

FIG. 3 is a diagonal view of one of the extruded forms produced from the billet of FIGS. 1 and 2.

DESCRIPTION OF THE PREFERRED EMBODIMENT

FIG. 1 illustrates the principal parts of a conventional extrusion press. A force is exerted by a ram on a hardened steel stem 12 against a hardened steel dummy block 14, which pushes against a cut-off 16 made of an expendable, common material such as heated, low-carbon steel. The force of the stem is applied against a heated cylindrical billet 18 which is constrained circumferentially by a hardened steel liner 20 shrunk into a steel container 22. In the illustrated case the liner defines a cylindrical cavity. Thereby, the billet is forced through a circular steel die 24 supported by a steel bolster 26. This reduces the heated billet 18 from one end to the other to form a round extruded rod 28. If the die were non-circular, the same non-circular shape would be imparted to the rod 28.

The extrusion cycle is complete after the cut-off 16 has been partly extruded through the die, and it, together with the dummy block 14, is removed from the liner 20 by the action of the stem 12.

The billet 18 as initially fabricated is enclosed within a metal can 30 to which is welded a front end cap 31 and a rear end cap 32. The front end cap is initially substantially identical in size and shape to the rear end cap. The two end caps are sealed to the can and the enclosed space is evacuated through an evacuation tube 34, shown as being pinched off in the drawing. A nose 36 that is initially substantially identical in size and shape to the cut-off 16 is welded on the front end cap and is shaped by a chamfer to aid in initiation of flow through the die. The front end cap 31 and the nose 36 are shown in the drawing in their condition following extrusion, whereas as stated previously, before extrusion they have configurations like the rear end cap 32 and the cut-off 16, respectively. Before extrusion, a layer of lubrication 38 is applied over the entire cylindrical surface of the billet, the can 30, the forming surfaces of the die 24, and to some extent over the rod 28.

The volume within the can 30 is occupied by filler material and a number of preforms. The filler material comprises a stack of thin wafers, lamina or disks 40.

FIG. 2 illustrates a single one of the disks 40 and all disks are preferably substantially identical to it. In this figure a billet having eight preforms has been illustrated by way of example, although more or fewer preforms may be used. Moreover, the particular preforms have been chosen to illustrate a variety of techniques that may be employed, although in practice a single billet is usually designed to incorporate only a fraction of the features shown.

The illustrated billet 18 is fabricated as follows. First, the circular peripheral outlines of a number of identical disks 40 are stamped or flame cut out of flat sheet steel of a type suitable for filler material. In the same or the next subsequent operation, outlines corresponding to the preforms are stamped out, or in the alternative these outlines may be formed by flame cutting. The pieces so removed are discarded. An exception is the case of an L-shaped preform 42, the outline of which is cut out in a later step as described below. In this manner the outlines are cut out for an F-shaped preform 44, a T-shaped preform 46, a distorted T-shaped preform 48, an O-shaped preform 50, a J-shaped preform 52, a C-shaped preform 54 and a Y-shaped preform 56.

Next, enclosed outlines 58 and 60 are stamped out or cut out by flame cutting. The pieces removed from the outline 58 are saved, while those removed from the outline 60 are discarded as further described hereinafter.

In the next step each disk is cut on a band saw or by any other equivalent means into a plurality of separable segments. The separate segments are analogous to the pieces of a jigsaw puzzle that are loosely fitted together since the process of cutting removes a quantity of material equal to the width of the cut, leaving a gap of about .01 to .10 inch. In this manner the outlines enclosing segments 62, 64, 66, 68 and 70 are cut out, these outlines containing no preform outlines. Similarly, segments containing one or more preform outlines are separated from one another, including an irregular shaped segment 72 containing the outlines of preforms 46, 48 and 50, a circular shaped segment 74 containing the outline of preform 52, an irregular shaped segment 76 containing the outline of preform 56 and a square shaped segment 78 containing the outline of preform 44. In the process of cutting apart the segments 72 and 76 in this manner, the outline of the preform 42 is cut out, and the L-shaped piece so formed is discarded.

The foregoing cutting operations may be carried out on one or more stacked disks at a time. A wide latitude is available in designing the billet with respect to preform placement and the location of the segment outlines. The design may be adapted to automatic, programmed machinery wherein the location of punches or of saw or flame cutting lines and the sequence of steps is controlled automatically.

Next, like segments of the disks are arranged in stacks and each stack is dipped, sprayed or painted with a parting compound covering all surfaces except those forming the preform outlines. An exception is the case of the surfaces that define the outline of the preform 42, which are coated. The specific nature of the parting compound is described hereinafter.

Next, the assembled stacks are fitted into the can 30, to which one of the end caps 31 or 32 has been welded.

At the next step, the preform components, which may be of the same or different alloys, hereinafter further described individually, are end loaded into the corresponding recesses in the billet. Similarly, the spaces defined by the outlines 58 and 60 are filled by extrudable material as described hereinafter. When all recesses or voids have been filled, the remaining end cap and the nose 36, and sometimes the cut-off 16, are welded in place and the billet is evacuated through the evacuation tube 34 which is then pinched off to complete the fabrication of the billet.

The billet formed as described above is heated before extrusion, typically either by thermal conduction in a salt pot or by radiation in a resistance furnace, usually to a temperature of about 1800° to 2000° F. It is then ready for extrusion.

In some cases it is desired to produce a billet of non-cylindrical outline, this outline and that of the extrusion die, which has exactly the same or nearly the same shape, having surfaces that are largely either parallel or perpendicular to many of the longitudinal surfaces of the preform or preforms, in order to reduce the quantity of filler material required, to lower the extrusion forces required, and to maintain perpendicularity, parallelism and precision in the extruded forms. For this purpose, a can or liner and disks 40 of the desired non-cylindrical and non-circular outline are substituted in the steps of fabrication described above, the other steps being otherwise performed as described.

Typically, billets formed as described above may undergo a reduction in cross sectional area of 7 to 30 times in a single pass through the die 24. The rod 28 has a cross section substantially identical to that of the billet shown in FIG. 2, but reduced in diameter by the ratio of the diameters of the billet and rod. By way of illustration, this may require a pressure of 50 to 90 tons per square inch (t.s.i.), and the ram speed may be 50 to 300 inches per minute. During extrusion, the disks 40 become permanently and intimately bonded together through the action of pressure and heat.

After the extruded rod 28 has cooled, about ten percent of the length is cropped from each end and discarded. The can 30 is then readily removed, since it does not bond to the disks 40 because of the presence of parting compound on their outer surfaces. Similarly, the extrusion is readily opened up by mechanical processing along the longitudinal parting lines between the segments that were also coated with parting compound. This step releases the form corresponding to the L-shaped preform 42 without further processing. Each of the separated segments may then be shot or grit blasted to remove any chemically resistant material, after which it is immersed in solvent, typically dilute nitric acid. The solvent dissolves all of the filler material of which the disks 40 were composed, leaving bare forms such as the T-form 80 in FIG. 3, of uniform cross section. Since the segments 62, 64, 66, 68 and 70 contain no preforms, it is not necessary to immerse these in the solvent, and this saves materials and solution in addition to reducing the time required for dissolving the filler material. The mechanical separation of the segments also aids materially in saving time and solvents. The parting compound between the segments, previously mentioned, preferably consists of layers of non-bonding materials that extend longitudinally through the billet between the rear end cap 32 and the front end cap 31. Such non-bonding layers occupy the gaps or spaces between the segments of the disks and consist of carbon powder or cloth, powders of inert oxides such as alumina, chromia or magnesia, glass frit, sulfides such as those of zinc and cadmium, or calcium carbide applied as a slurry with liquid vehicle. These substances coextrude, but prevent certain segments of the laminated filler body from bonding together, as stated above.

In order that the extruded rod 28 will become an accurate isometric reduction in cross section of the original billet, it is necessary to have nearly streamlined flow of all of the materials that comprise the coextrusion billet. Such flow occurs if good lubrication is present between the billet and tools, if a die with a conical entry is used, and if the materials of the billet have a close match in their resistance to deformation, referred to as the "extrusion constant" or relative stiffness. This constant is given by the relation $k=F/A \ln R$, where $k$ is the extrusion constant (in tons/inch$^2$), F is the force required for extrusion (in tons), A is the cross section area (in inches$^2$) of the billet, R is the reduction ratio, that is, the ratio of the transverse cross-sectional area of the billet to that of the extrusion, and ln R is the natural logarithm of this ratio. The extrusion constant almost invariably decreases with increasing temperature. When using the filled billet method for shapes, sufficiently uniform co-extrusion of materials usually will occur if their constants do not differ by more than about 10%. The closer the match of the extrusion constants of the constituents in a coextrusion billet, the more nearly one produces an isometric reduction of the transverse cross section during the extrusion. Departures from close matches in extrusion constants lead to departures in streamlined flow, and to distortion and non-uniformity in the coextruded sections.

The die does not perform the shaping operation on the cross sections of the preforms but operates to reduce uniformly the cross sectional area of the billet that contains within it one or more previously shaped preforms. As a consequence of using the filled billet method as described above, it is possible to produce in almost any extrudable alloy a shaped section of almost any cross section including tapers, hollows, shapes with re-entrant angles, and shapes with both very thick and thin members. These shapes are impossible or almost impossible to produce by conventional methods of extruding cylindrical billets through shaped dies.

Another factor affecting streamlined flow is the die entry angle, which is the angle A defined at the apex of the converging extension of its conical surface, as shown in FIG. 1. When a conical die with an entry angle below 90° is used, not only does the central region of the billet experience almost uniform streamlined flow, in which every transverse cross-sectional element of area decreases by the ratio of the liner diameter to the die diameter (in the case of cylindrical tooling), but also, the region of the billet near the surface will likewise experience such streamlined flow. Thus it becomes possible, when the extrusion constants of the billet constituents are closely matched, to coextrude preforms in any cross-sectional region of the billet except at the very front and rear of the billet. Since die entry angles below 60° increase the extrusion force considerably, the die entry angle is preferably between 60° and 80°.

Since uniform coextrusion requires that the components of the billet should ordinarily have extrusion constants within 10% or less, the constant for the alloy or alloys that comprise the preforms determines the selection of the filler material. For many iron, nickel, cobalt, chromium, titanium and refractory alloys, the ideal filler material is low carbon steel because of its availability, low cost, and ease of removal by chemical means. However, many other alloys desired in the form of shapes are about 30% stiffer and have constants comparably greater than steel. It has been found that under proper conditions these alloys can also be successfully and uniformly coextruded with streamlined flow in steel. In these cases, the longitudinal surfaces of the tooling are maintained parallel to the longitudinal surfaces of the preform or preforms as closely as possible. Thus, when steel is used as the filler material, many shapes in these alloys with perpendicular or parallel members, such as H, L, T and I-sections, are best extruded in rectangular billets made as described above and extruded through rectangular dies.

Another type of filler material suitable for the stiffer preform materials consists of a powder metal composite of mild steel plus stiffening additions of alumina, chromia, magnesia or other inert refractory particles.

The temperature of the coextrusion billet prior to its extrusion is chosen in relation to the temperature at which extrusion constants of the components of the billet are most nearly equal, having regard for the maximum stress limitation on the stem 12 and the needed, desired, or efficient reduction ratio. Generally, the stress limitation on the stem in most presses is under 90 t.s.i., although it is sometimes as high as 110 t.s.i. Ordinarily, the extrusion is designed for 50 to 90 t.s.i. pressure, and the extrusion reduction in area is between about 7 and 30 times, which corresponds to a composite billet constant of 10 to 25 t.s.i. when the matrix is low-carbon steel, the most typical case. These extrusion conditions generally involve billet temperatures between 1700° and 2200° F., but primarily between 1800° and 2000° F. Such temperatures are significantly below temperatures used for the conventional extrusion of many of the alloys that can be economically and reliably extruded following the practice of this invention. These lower temperatures lead to advantages in terms of better metallurgical properties in the extruded sections, lower heating cost and less die wear.

The coextrusion billet is designed so that the transverse cross sections of the preforms to be extruded reside within the transverse cross section of the disk 40 (FIG. 2). The area of the transverse cross section of each preform is designed to equal that of the extruded section or form multiplied by the ratio of the diameter of the liner 20 to the smallest diameter of the die 24 when cylindrical tooling is used. The dimensions of components for rectangular billets are designed according to the ratio of the thickness or width of the cavity in the liner 20 relative to the desired thickness or width of the extrusion. The length of the preforms should be at least as great as the length of the desired form or forms, plus the yield loss, divided by the area reduction of the extrusion. A typical yield loss is 10 to 30 percent.

The diameter of the coextrusion billet, when cylindrical tooling is used, is equal to the product of the square root of the chosen area reduction ratio and the diameter of the extruded rod that can efficiently contain the desired number and shape of the extruded forms. For example, if an extruded rod must be 3 inches in diameter to contain a given number of extruded forms of given size and the chosen area reduction is 16 times, then the billet diameter is 12 inches. If the composite extrusion constant for the coextrusion billet is 20 t.s.i. at the chosen temperature, then according to the mathematical relation previously described, the capacity of the press must be 6,260 tons. The limitation on the length of the billet is the length of the extrusion liner 20 minus the length of the cut-off 16, the dummy block 14 and a few inches of the stem 12.

We turn next to a more detailed description of the individual preforms. Referring to FIG. 2, the O-shaped or tubular preform 50, the F-shaped preform 44 and the distorted T-shaped preform 48 can be machined from solid material, or they can be formed of pressed powder, unpressed powder, sintered powder or stacks of shaped wafers stamped from plate stock, which fill the volume of the shaped cavities in which they reside. The powder may be poured into the shaped cavities and densified by pressing if necessary. During extrusion, if the preforms are free from contaminants in accordance with techniques known to those skilled in the art, such powders and wafers become fully dense, wrought, metallurgically sound, extruded sections or forms.

The F-shaped preform 44 is formed of three elongate strips of flat stock 44a, 44b and 44c inserted into the corresponding recesses. In the process of extrusion, the contiguous surfaces of these strips become permanently united to form a unified, metallurgically sound, wrought product.

The Y-shaped preform 56 comprises a formed inner member 56a, such as a forging, extrusion or casting of a relatively coarse grain, covered by a thin, fine-grained sheet or powder 56b of the same alloy, which becomes permanently united with the member 56a in the process of extrusion and imparts a smooth surface finish to the resulting form.

As stated above, the disks 40 are divided into segments by parting compound. By this means segments of the filler material that do not contain preforms such as 62, 64, 66, 68 and 70 can be separated from the other segments and are not immersed in the solvent. Another method of avoiding unnecessary action of the solvent on portions that do not contain a preform is illustrated by the outline 58. The parts cut from this outline are stacked, wrapped or clad in a thin, acid-resistant metal sheet such as stainless steel and end loaded into the billet. The solvent does not attack the material within this outline.

The outline 60 illustrates another method in which the space it defines is filled with a body that is either substantially more soluble or less soluble than the filler material. In either case chemical processing time is saved. The body may be preformed or may be a powder filled into this space and formed by it. An example of a less soluble body is a friable but coextrudable material such as graphite which may be removed by mechanical action after extrusion, if desired. A more soluble body is calcium carbide, for example.

The preform 54 comprises a shaped member 54a canned in a thin layer 54b of the filler material in sheet form. This can may also be sealed at its ends to enclose the member 54a, which is advisable when there are materials in the billet, such as those making up the parting compound, that may contaminate the preform. It is released by mechanical action when the extruded rod is opened up and since it is thin it is quickly dissolved in the solvent.

The tubular preform 50 has a fitted tubular insert 50a of filler material. Fitted within this insert is a core or rod 50b of graphite or similar friable material covered by a layer 50c of a material that is readily dissolved in solvent, such as calcium carbide. After extrusion, the graphite core is readily drilled out mechanically. When the extrusion is immersed in solvent, the layer 50c quickly dissolves to expose the filler insert 50a, and the latter is then dissolved at a uniform rate to obtain the bare form. The advantage of the layer 50c is that if a portion of the graphite, which resists the solvent action, is not removed during drilling, when a solvent such as water or hydrochloric acid is flushed through the drilled hole, it then readily attacks adjacent exposed portions of the layer 50c, thereby reaching the regions around and under the remaining graphite, releasing it and permitting it to fall away.

After the forms such as the form 80 shown in FIG. 3 have been relased from filler material, they may be subjected to various forming operations, for example to produce tapers, rings of reduced size, or other configurations. The distorted T-shaped preform 48 illustrates another example. The form produced from this preform may be subjected to mechanical action such as drawing, rolling or swaging to straighten the curved portion so that this form will have the same cross-sectional shape as the form produced from the preform 46. An advantage of using a distorted preform 48 in the billet is that in some instances the distortion permits the fitting of a greater number of preforms in a single billet.

Often, the extruded sections or forms may require one or two roll or draw passes through shaped dies to bring the sections within the close tolerances needed for many applications.

A square parting line surrounds the segment 78 containing the preform 44. After extrusion, this segment may be separated mechanically from the rest of the extruded rod, and it may be subjected to mechanical forming operations prior to chemical removal of the filler material within the segment. For example, it may be rolled into a ring or arc with simple tools. The filler material supports the thin section of the form during the forming operation and prevents rippling or other distortions. The flat-sided configuration aids, if desired, in determining the direction of curvature of asymmetrical forms relative to their cross-sectional features.

A circular parting line surrounds the segment 74 containing the preform 52. After extrusion, this segment may also be separated mechanically from the rest of the extruded rod, and it may also be subjected to mechanical forming operations prior to chemical removal of the filler material within the segment. For example, the extruded segment 74 may be enclosed within a tapered tube similar in shape to a flag pole, this tube being filled with coformable metal shot such as conventional metal abrasive materials.

The tube may then be closed at each end with an end plate. It may then be rolled through rolls operative uniformly in all radial directions, until it has a uniform outside diameter. After this operation, the segment may be removed and subjected to chemical action, thus releasing the form itself which will have been tapered in two directions longitudinally by the action of the rolls, being smallest where the tube was initially largest and largest where the tube was initially smallest.

Much the same procedure may be used to produce a one-directional taper on the F-section 44. Tapered slabs of coformable metal may be welded to only the top and bottom, or left and right sides of the segment 78, and the assembly may be reduced through flat rolls to produce a one-dimensional taper in the F-section either from top to bottom or from side to side. The selection of suitable coformable tapered tubes, slabs or other bodies is determined in accordance with established metal working procedures.

It is also possible to produce two-dimensional tapers on all the sections in the entire extruded rod 28 by following the procedure described above for the J-shape 52. In this case the entire rod 28 is placed in a metal-filled tapered tube larger than the tube described for the J-shape 52.

What is claimed is:

1. A compositely formed extrusion billet adapted for extrusion through a die to reduce the cross sectional area of the billet as its length is elongated, said billet comprising a plurality of discs assembled in stacked relationship and having opposed surfaces, in contiguous relation when so assembled, said discs each having an opening therethrough which openings, in said stacked relationship, are aligned to form a passageway extending longitudinally of said billet and defined by substantially continuous uninterrupted surfaces of said disc openings, and a single preform having longitudinal surfaces all of which are substantially contiguous with the longitudinal-passageway-defining surfaces of said discs.

said discs being enclosed in a tube having an inner peripheral outline approximating and in contiguous relation with the outer peripheries of said discs, said discs and preform both being of extrudable material and capable of substantial compressional deformation and respectively having extrusion constants which do not differ by more than approximately 30%.

2. An extrusion billet as in claim 1 wherein said preform is formed of a solid, homogeneous metal.

3. An extrusion billet as in claim 1 wherein
said tube has closures at its opposite ends sealing the inner portions thereof,
said tube further is evacuated, and
the material of said tube and end closures also is extrudable, capable of substantial compressional deformation and has extrusion constants which do not vary by more than approximately 30% from the extrusion constants of the discs and preform.

4. An extrusion billet as in claim 1 wherein
the peripheral outline of the preform differs from that of the peripheral outline of the discs.

5. An extrusion billet as in claim 1 wherein
each of said discs has a plurality of openings therethrough, said plurality of openings being respectively aligned, when the discs are in stacked relationship, to form a plurality of passageways extending longitudinally of said billet, each of said passageways being defined by substantial continuous uninterrupted surfaces of said disc openings, and
the billet further comprises a plurality of preforms respectively disposed in said disc passageways with the longitudinal surfaces of the preforms in substantial contiguous relationship with the longitudinal passageway in which it is disposed.

6. An extrusion billet as in claim 1 wherein
at least one major longitudinal surface of the preform is equi-spaced from the adjacent outer surface of the billet, as defined by the stacked discs.

7. The method of manufacturing a compositely formed extrusion billet adapted for extrusion through a die to reduce the cross sectional area of the billet as its length is elongated, comprising the steps of
forming a plurality of discs having parallel opposed surfaces and identical outer peripheries,
forming openings through each disc, said openings having the same orientation relative to the discs and being adapted to form a passageway,
assembling said discs in stacked relationship with the openings thereof aligned to form a passageway defined by the substantially continuous, uninterrupted surfaces of said openings,
disposing a single preform in said longitudinal passageway with the longitudinal surfaces thereof in substantially contiguous relationship with the passageway defining surfaces of said discs, and
enclosing said discs in a tube having an inner peripheral outline approximately the outer peripheries of said discs and in engagement therewith,
said discs and preforms being formed of extrudable material, capable of substantial compressional deformation and respectively having extrusion constants which do not differ by more than approximately 30%.

8. The method of claim 7 comprising the further steps of
attaching end closures to the tubes, and
evacuating the interior of said tube,
said tube and end closures further being formed of extrudable material capable of substantial compression deformation and having extrusion constants which do not differ by more than approximately 30% from the extrusion constants of the discs and preform.

9. The method of claim 7 comprising the further steps of
forming in each disc, a second opening therethrough, each of said second openings being formed in spaced relationship from the first openings and having the same orientation relative to the discs and being adapted to form a second passageway,
whereby when the discs are assembled in stacked relationship, the second openings will be aligned to form a second passageway defined by the substantially continuous, uninterrupted surfaces of said second openings, and disposing a second preform in said second longitudinal passageway with the longitudinal surfaces thereof in substantially contiguous relationship with the second passageway defining surfaces of said discs, said second preform also being formed of extrudable material capable of substantial compressional deformation and having an extrusion constant which does not differ by more than approximately 30% from that of the discs.

10. A compositely formed extrusion billet adapted for extrusion through a die to reduce the cross sectional area of the billet as its length is elongated, said billet comprising a body of filler material having a longitudinal passageway, a preform disposed in said passageway with substantially the entire longitudinal surfaces thereof in substantially contiguous relationship with the surfaces of said passageway, said filler material and preform, both being of extrudable material and capable of substantial compression deformation and respectively having extrusion constants which do not differ by more than approximately 30%, said body of filler material being compositely formed of a plurality of lengthwise segments substantially free of voids therebetween and having lengthwise mating surfaces between adjacent segments, with one of said segments encasing said preform, said lengthwise mating surfaces being coated with a parting compound, whereby after extrusion of the billet, said segments may be readily separated by splitting or the like, for further processing thereof and/or facilitating removal of the filler material from the extruded preform.

11. An extrusion billet as in claim 10 wherein the body of filler material comprises a plurality of discs assembled in stacked relationship, said discs having openings therethrough which in said stacked relationship are aligned to define the preform receiving passageways which passageway is defined by substantial contiguous uninterrupted surfaces of the disc openings, said discs further being formed in segments which in said stacked relationship comprise the lengthwise segments of the body of filler material.

12. An extrusion billet as in claim 10 wherein the body of filler material includes a lengthwise element of material having an extrusion constant which does not vary by more than approximately 30% from the extrusion constant of the preform and filler material and further which has a substantial different resistance to chemical attack from that of filler material, whereby chemical removal of the filler material from an extrusion preform is facilitated.

13. An extrusion billet as in claim 12 wherein the body of filler material has an outer periphery of a given outline and further comprising a tube having an inner peripheral outline approximately the outer periphery outline of the filler material and encasing same in the contiguous relationship thereto, said tube further having closures at its opposite ends sealing the inner portions thereof, said tube further being evacuated, and the material of said tube and end closure also being extrudable capable of substantial compression deformation and having extrusion constants which do not differ by more than approximately 30% from the extrusion constant of the filler material and preforms.

14. An extrusion billet as in claim 10 wherein at least one of the lengthwise segments has a regular outline for facilitating further processing of the preform, after extrusion and separation.

15. An extrusion billet as in claim 14 where the outer periphery of the body of filler material is circular, and the lengthwise segment of regular outline is rectangular and further wherein, the body of filler material contains at least one further lengthwise segment having a lengthwise mating surface with said rectangular segment and another segment, said further segment having its lengthwise mating surface coated with a parting compound, whereby after extrusion, said further segment can be readily removed for separation of the rectangular segment.

16. An extrusion billet as in claim 15 wherein the body of filler material is encased in a tube contiguous with the outer peripheral surface of said body of filler material, and enclosure seal the opposite ends of said tube and said body of filler material, and further characterized in that the tube is evacuated.

17. The method of manufacturing compositely formed extrusion billets adapted for extrusion through a die to reduce the cross sectional area of the billet as its length is elongated comprising the steps of forming a body of filler material from a plurality of lengthwise segments at least one of which has a longitudinal passageway, said segments being formed with lengthwise mating surfaces which, in assembled relation are in mating engagement and adjacent segments are free of voids therebetween, coating the lengthwise mating surfaces with a parting compound, assembling said segments with their coated surfaces in mating relationship, and disposing within said passageway a preform having longitudinal surfaces in substantial complete contiguous relationship with said passageway, said body of filler material being formed from a material having an extrusion constant differing by no greater than approximately 30% from the extrusion constant of the preform.

18. The method of claim 17 further comprising the steps of passing the billet through an extrusion die, and thereafter separating the reduced cross section segments at said contiguous interfaces for further processing of the segments and/or removal of the filler material from the extruded preform.

19. The method of claim 17 further comprising the further steps of cutting a lengthwise core of filler material, spaced from said passageway from the body of filler material, cladding said core in a material resistant to chemical attack, and inserting said clad core into the opening formed by its removal from the billet to thereby form a segment within said billet which is resistant to chemical attack.

20. The method of claim 17 comprising the further steps of forming a further lengthwise passageway in said body of filler material spaced from the preform receiving passageway, and filling said further passageway with extrudable material having a low resistance to chemical attack.

21. The method of claim 17 comprising the steps of forming a plurality of discs having parallel opposed surfaces and identical outer peripheries.

forming a plurality of openings through each disc, said openings having the same orientation relative to said discs and being respectively adapted to form passageways, separating the individual discs into disc segments of the same configuration, assembling said discs into stacked relationship with the openings thereof respectively aligned to form said passageways defined by the respectively continuous, uninterrupted surfaces of respective openings to thereby form said billet.

22. The method of claim 18 wherein the billet is passed through a die having an entrance angle between approximately 60 degrees and 80 degrees.

23. A compositely formed extrusion billet adapted for extrusion through a die to reduce the cross sectional area of the billet as its length is elongated said billet comprising
  a body of filler material having a longitudinally extending passageway therein,
  a preform of extrudable material disposed within said passageway with substantially all of its longitudinally extending surfaces in substantially contiguous relationship with said passageway,
  said body of filler material being of a material capable of substantial compression deformation and having an extrusion constant differing by no more than approximately 30%,
  said billet of filler material comprising a plurality of longitudinal segments having separable, mating longitudinal interfaces intersecting said passageway, said interfaces being coated with a parting compound and further, the surface of said passageway being coated with parting compound whereby after extrusion, the filler material can be readily removed from the extruded preform by splitting or the like.

24. An extrusion billet as in claim 23 wherein the preform is clad in a thin layer of filler material separating the preform from the parting compound coating said passageway.

25. An extrusion billet as in claim 24 wherein the preform comprises a powdered metal which is solidified into a homogeneous, solid structure when subjected to compressional forces.

26. An extrusion billet as in claim 25 wherein the body of filler material is encased in a tube contiguous with the outer peripheral surface of said body of filler material, and
  enclosures seal the ends of said tube and said body of filler material, and
  further characterized in that the tube is evacuated.

27. An extrusion billet as in claim 23 wherein said body of filler material comprises a plurality of discs assembled in stacked relationship and having opposed surfaces in contiguous relation when so assembled, said disc surfaces lying generally in planes normal to said passageway, and
  said preform is a solid metal structure.

28. The method of forming a composite extrusion billet comprising the steps of
  forming a body of filler material from a plurality of lengthwise segments, said segments being formed with mating interfaces extending longitudinally thereof,
  forming passageway defining surfaces in said segments which are intersected by said interfaces,
  coating and interfaces and said passageway defining surfaces with a parting compound, and
  assembling said segments with said mating interfaces in contiguous relationship, and
  disposing a preform within the passageway defined by said segments,
  said body of filler material and said preform being formed of extrudable materials capable of substantial compression deformation and having extrusion constants which do not differ more than approximately 30%.

29. The method of claim 28 including the further steps of
  passing the billet so formed through an extrusion die, and
  thereafter separating the reduced cross section segments at said contiguous interfaces to remove the preform therefrom.

30. The method of claim 28 including the further step of
  lining the coated passageway with a thin layer of filler material, and
  inserting powdered metal into the thus lined passageway,
  encasing the body of filler material in a tube which is in contiguous relationship with the outer peripheral surface of the body of filler material,
  attaching enclosures to the ends of said tube to form a sealed chamber,
  and evacuating the interior of said tube.

31. A compositely formed extrusion billet adapted for extrusion through a die to reduce the cross sectional area of the billet as its length is elongated, said billet comprising
  a body of filler material having a longitudinal passageway,
  a hollow preform having a longitudinal opening therethrough, the outer surface of said preform being in substantial complete contiguous relationship with said passageway,
  a hollow core of filler material extending through the longitudinal opening of said preform and in contiguous relation with substantially the entire inner surface thereof, and
  a central core of extrudable, friable material within the hollow core of filler material,
  said filler material and said preform and said friable material having extrusion constants which do not differ more than by approximately 30%,
  whereby after extrusion of the billet, the central core of friable material may be readily removed mechanically to facilitate chemical removal of the filler material from the inner and outer surfaces of the preform.

32. An extrusion billet as in claim 31 wherein the central core of friable material is surrounded by a layer of material having a relatively low resistance to chemical attack thereby further facilitating chemical removal of filler material from the inner surface of said preform.

33. An extrusion billet as in claim 32 wherein the friable material is graphite.

34. An extrusion billet as in claim 31 wherein the body of filler material comprises a plurality of discs assembled in stacked relationship with their opposite faces in contiguous relationship.

35. The method of forming an extrusion billet for extrusion through a die to reduce the cross sectional area of the billet as its length is elongated, said method comprising the steps of
  forming a longitudinal passageway in a body of filler material,
  disposing a hollow preform within said passageway with the outer surface thereof being in substantially complete contiguous relationship with said passageway,
  inserting a hollow core of filler material within the hollow preform with the outer surface of the hollow core of filler material in substantially complete contiguous relationship with the inner surface of the preform, and
  inserting a central core of extrudable, friable material within the hollow core of filler material,
  said filler material and said preform and said friable material having extrusion constants which do not differ by more than approximately 30%.

36. The method of claim 35 comprising the further steps of extruding the billet so formed through a extrusion die to reduce the cross sectional area thereof, and mechanically removing said friable material, and chemically removing said filler material.

References Cited

UNITED STATES PATENTS

| | | | |
|---|---|---|---|
| 154,393 | 8/1874 | Hill | 52—722 X |
| 1,553,158 | 9/1925 | Henderson | 52—722 X |
| 1,567,301 | 12/1925 | Ross | 52—722 X |
| 2,001,134 | 5/1935 | Hardy | 75—214 |
| 2,050,298 | 8/1936 | Everett | 29—423 X |
| 2,169,937 | 8/1939 | Wempe | 29—423 X |
| 2,477,279 | 7/1949 | Anderson, Jr. | 29—191.6 X |
| 2,718,049 | 9/1955 | Prache | 29—423 |
| 2,902,364 | 9/1959 | Deutsch | 75—214 |
| 3,174,837 | 3/1965 | Mears | 29—191 |
| 3,326,679 | 6/1967 | Wallace | 75—214 X |
| 3,327,371 | 6/1967 | Kerns et al. | 29—423 X |
| 3,378,369 | 4/1968 | Smith | 75—214 X |
| 3,390,985 | 7/1968 | Croeni et al. | 29—420.5 X |
| 3,440,042 | 4/1969 | Kauffmann | 75—214 X |
| 3,496,035 | 2/1970 | Foerster | 29—182 X |
| 3,553,829 | 1/1971 | Hunt et al. | 29—423 X |
| 3,559,271 | 2/1971 | Nilsson | 29—420.5 |
| 3,564,566 | 2/1971 | Heitman | 29—423 |
| 3,137,385 | 6/1964 | Levesque | 161—213 X |
| 3,004,640 | 10/1961 | Macomber | 29—191 X |
| 3,567,407 | 3/1971 | Yoblin | 29—191.6 X |
| 2,390,183 | 12/1945 | Seligman | 29—191.2 X |
| 1,891,546 | 12/1932 | Krembs | 29—191.2 |
| 2,359,983 | 10/1944 | Fry | 29—191.2 OX |
| 3,195,686 | 7/1965 | Johnson | 29—191 X |
| 3,291,870 | 12/1966 | Allison | 29—191 X |
| 3,469,952 | 9/1969 | Baker | 29—191.6 X |
| 3,505,039 | 4/1970 | Roberts et al. | 29—191.6 |
| 1,392,300 | 10/1921 | Cole | 29—191 X |

ALLEN B. CURTIS, Primary Examiner

O. F. CRUTCHFIELD, Assistant Examiner

U.S. Cl. X.R.

29—423